United States Patent [19]

Hopkins

[11] Patent Number: 5,479,714
[45] Date of Patent: Jan. 2, 1996

[54] HEADLAMP LEVELING APPARATUS

[75] Inventor: Evan L. Hopkins, Emporia, Kans.

[73] Assignee: Hopkins Manufacturing Corporation, Emporia, Kans.

[21] Appl. No.: 393,567

[22] Filed: Feb. 6, 1995

[51] Int. Cl.$^6$ .............................. G01B 5/24; B60Q 1/04
[52] U.S. Cl. .................. 33/335; 33/288; 33/372; 362/61
[58] Field of Search ............................ 33/335, 333, 288, 33/370, 371, 376, 384; 362/61, 101

[56] References Cited

U.S. PATENT DOCUMENTS

| | | |
|---|---|---|
| 2,058,743 | 10/1936 | Trippe . |
| 4,226,530 | 10/1980 | Broom . |
| 4,461,090 | 7/1984 | Hopkins . |
| 4,569,002 | 2/1986 | English et al. . |
| 4,660,128 | 4/1987 | Bergin et al. . |
| 4,794,495 | 12/1988 | McMahan et al. . |
| 4,802,067 | 1/1989 | Ryder et al. . |
| 4,916,583 | 4/1990 | Nagasawa . |
| 4,922,387 | 5/1990 | Ryder et al. . |
| 4,970,629 | 11/1990 | McMahan . |
| 4,984,136 | 1/1991 | Yamagishi et al. . |
| 5,029,051 | 7/1991 | Shirai et al. . |
| 5,031,081 | 7/1991 | Daumueller et al. . |
| 5,032,964 | 7/1991 | Endo et al. . |
| 5,047,905 | 9/1991 | Collot et al. . |
| 5,050,048 | 9/1991 | Hendrischk et al. . |
| 5,055,980 | 10/1991 | Mochizuki . |
| 5,063,480 | 11/1991 | McMahan et al. . |
| 5,063,482 | 11/1991 | Collot et al. . |
| 5,065,293 | 11/1991 | Mochizuki . |
| 5,067,056 | 11/1991 | Suzuki et al. . |
| 5,075,825 | 12/1991 | Collot et al. . |
| 5,077,642 | 12/1991 | Lisak . |
| 5,083,244 | 1/1992 | Shirai et al. . |
| 5,107,407 | 4/1992 | Collot et al. . |
| 5,111,369 | 5/1992 | Shirai et al. . |
| 5,121,303 | 6/1992 | Shirai et al. . |
| 5,138,532 | 8/1992 | Shirai et al. . |
| 5,138,533 | 8/1992 | Daumueller . |
| 5,140,503 | 8/1992 | Lisak . |
| 5,151,849 | 9/1992 | Nagenast et al. . |
| 5,221,137 | 6/1993 | Lovelace et al. . |
| 5,253,154 | 10/1993 | McMahan et al. . |
| 5,295,053 | 3/1994 | Shirai et al. . |
| 5,408,391 | 4/1995 | Denley ...................................... 33/335 |

*Primary Examiner*—Christopher W. Fulton
*Attorney, Agent, or Firm*—Hovey, Williams, Timmons & Collins

[57] ABSTRACT

A leveling apparatus is provided for use on the reflector of an automotive headlamp assembly for permitting the assembly to be leveled on an automobile so that the beam of the headlamp is aimed in a predetermined direction. The apparatus includes a level and a holder for supporting the level on the reflector. A pair of arms are connected to opposite sides of the front end of the holder, and include a pair of pawls for securing the holder to the headlamp assembly. An adjustment member is connected to the rear of the holder for adjusting the angular orientation of the level relative to the reflector so that a horizontal indication is provided by the level when the reflector is properly oriented for use. Each arm includes an inner arm segment that is connected to the front end of the holder and extends rearward to a rear free end and an outer arm segment that is connected to the rear free end of the inner arm segment and extends forward to a forward free end. The arms define springs for biasing the rear end of the holder downward and for biasing the pawls toward one another in a direction generally transverse to the length of the level.

12 Claims, 2 Drawing Sheets

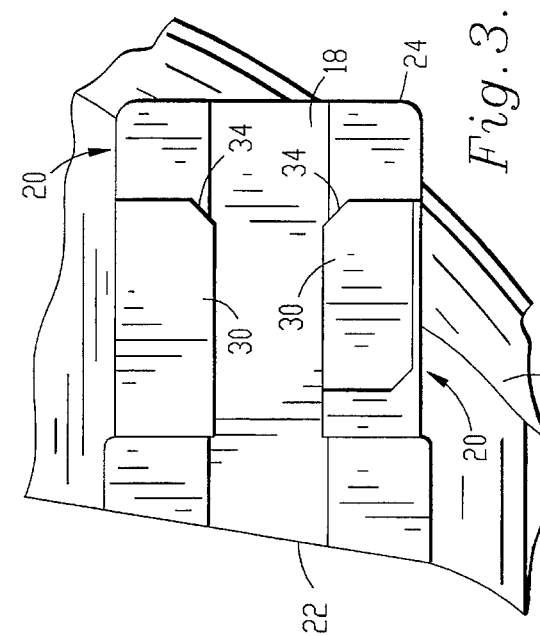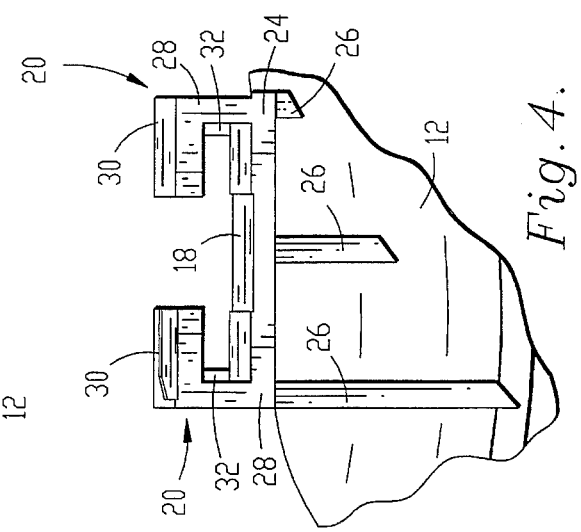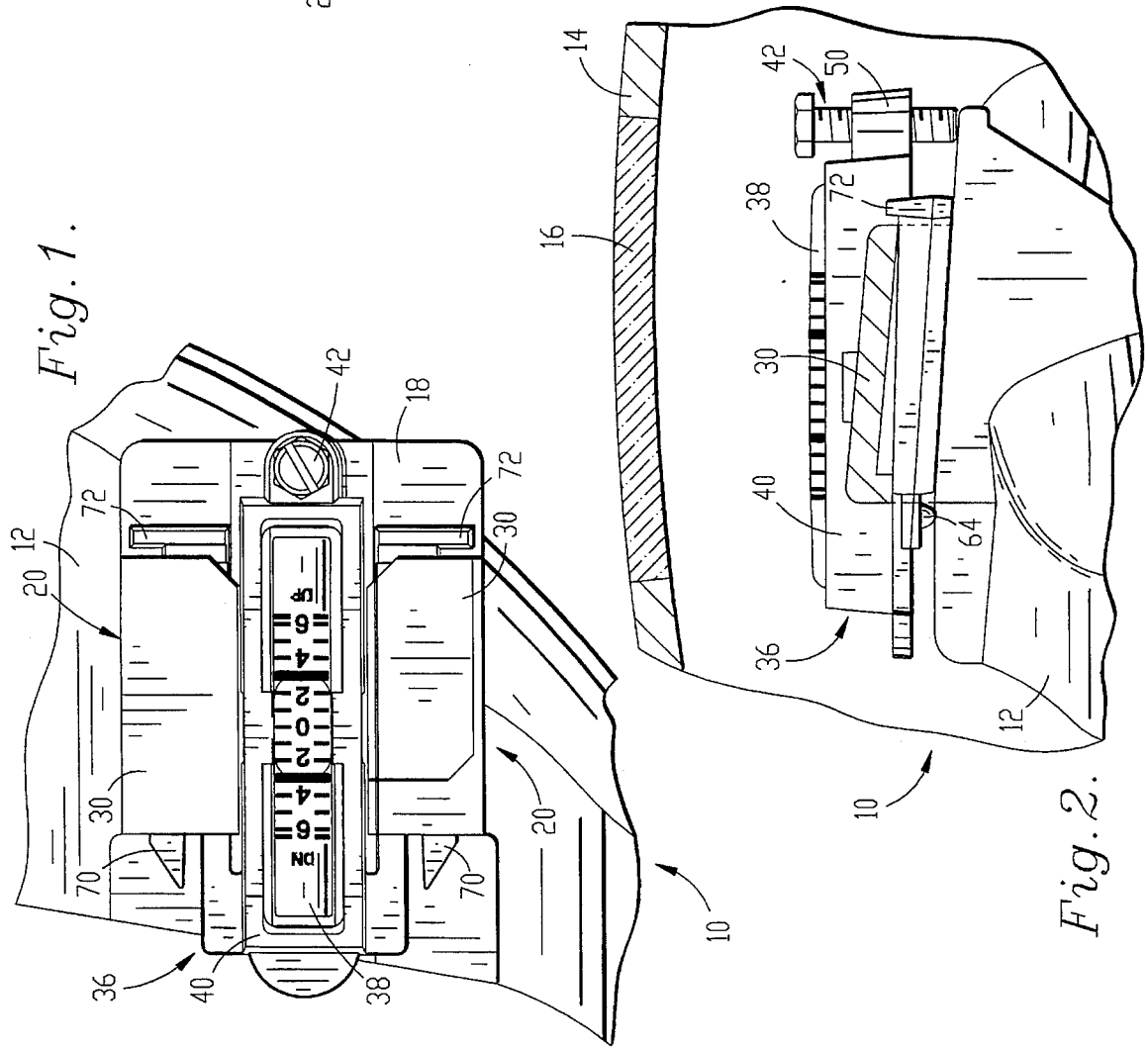

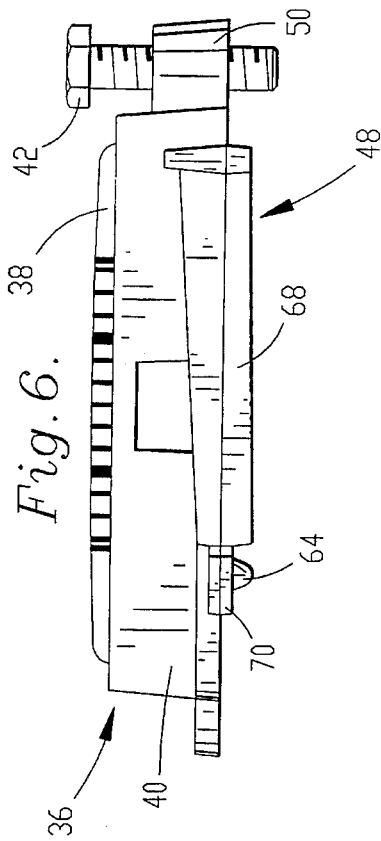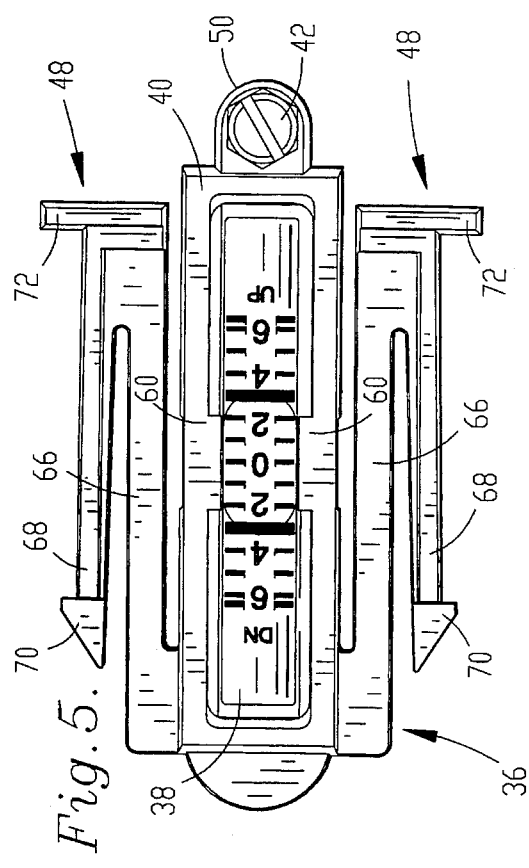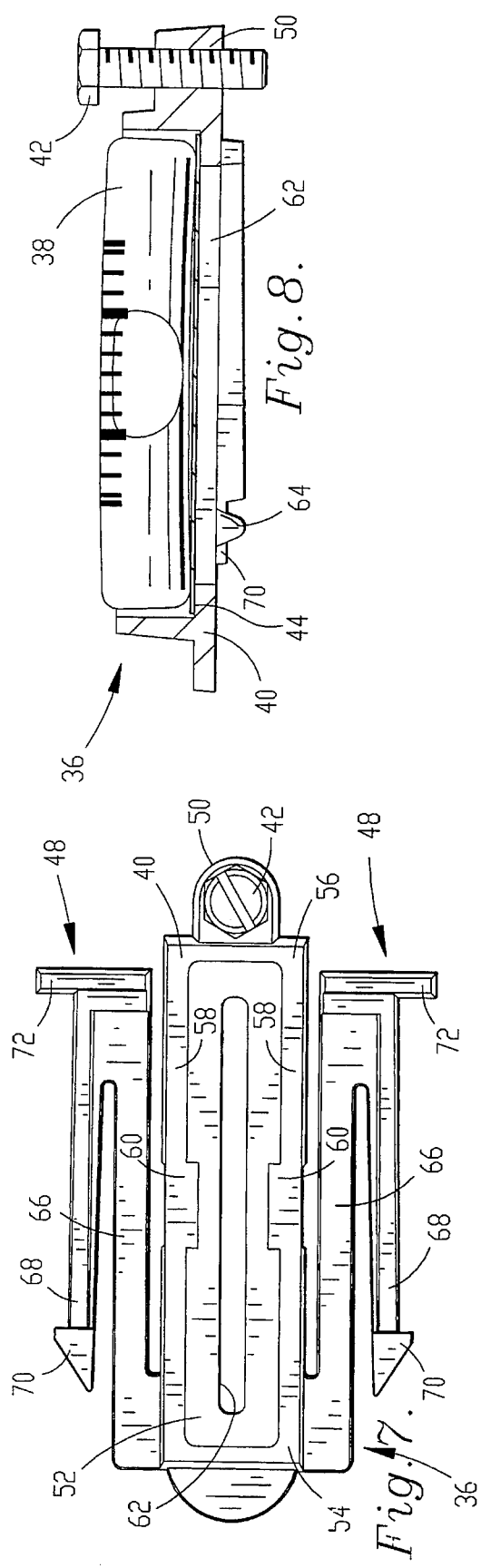

HEADLAMP LEVELING APPARATUS

BACKGROUND OF THE INVENTION

1. Field of the Invention

The present invention relates generally to automobile headlamp assemblies and, more particularly, to a leveling apparatus for use on a headlamp assembly for permitting the assembly to be leveled relative to an automobile on which it is installed.

2. Discussion of the Prior Art

It is known to provide a leveling apparatus on an automotive headlamp assembly for permitting the headlamp assembly to be aligned on an automobile so that the beam of the headlamp is directed forward at a desired angle. Such constructions typically include a bubble-type level that is supported on a frame or holder that is, in turn, retained on the headlamp assembly by a friction fit between the holder and the assembly. In addition, an adjustment member is provided between the level and the holder for changing the angular relationship therebetween. This expedient permits the angle between the level and the holder to be set to provide a level indication in any selected predetermined angular orientation of the holder.

When the apparatus is installed on a headlamp assembly and the assembly is installed on an automobile, the vertical orientation of the assembly on the automobile can then be adjusted until a level indication is provided by the level. If the original calibration of the level relative to the holder is done properly, and the position of the holder is fixed on the headlamp assembly, a reliable indication is provided when the assembly is properly oriented on the automobile. An additional mechanism may also be provided on the headlamp for indicating a proper horizontal orientation of the assembly on an automobile. Thus, both vertical and horizontal alignments are possible.

Because the adjustment member extends between the level and the holder, however, it is essential for the holder to be properly positioned on the headlamp assembly for an accurate level indication to be possible. It would be preferred to provide an apparatus that permits direct adjustment of the angle between the level and the headlamp assembly so that a reliable level indication is not dependent upon the orientation of an intermediate, relatively movable holder.

Other problems are also encountered in conventional leveling apparatuses. For example, such devices include complicated constructions made up from several parts that must be assembled during installation on the headlamp assembly. Also, the conventional apparatuses provide for a friction fit between the level apparatus and the headlamp assembly without positively locking the apparatus in place. Thus, it is possible for vibration or other action to dislodge the apparatus from the assembly, rendering the apparatus inoperable.

OBJECTS AND SUMMARY OF THE INVENTION

It is an object of the present invention to provide a leveling apparatus having a simple construction that may be easily assembled on a headlamp assembly, and including relatively few parts. In addition, the materials used to construct the apparatus are selected to resist the high temperatures experienced in headlamp assemblies.

It is another object of the invention to provide an apparatus that can be positively locked in place on a headlamp assembly so that the apparatus will stay in place during the life of the assembly without being dislodged and lost.

In accordance with these and other objects evident from the following description of a preferred embodiment of the invention, a leveling apparatus is provided for use on an automotive headlamp assembly for permitting a reflector of the assembly to be leveled relative to an automobile on which the assembly is mounted. The apparatus comprises a level and a support means for supporting the level on the headlamp assembly. The support means includes a holder for the level, a securing means for securing the holder to the headlamp assembly, and an adjustment means for adjusting the angular orientation of the level relative to the reflector so that a level indication is provided when the headlamp assembly is properly oriented for use, wherein the holder includes a front end to which the securing means is connected and a rear end to which the adjustment means is connected.

The securing means includes a pair of arms connected to opposite sides of the front end of the holder. Each arm preferably includes an inner arm segment that is connected to the front end of the holder and extends rearward to a rear free end, and an outer arm segment that is connected to the rear free end of the inner arm segment and extends forward to a forward free end. Each outer arm segment includes a pawl for engaging the reflector to secure the holder in place, the arms together defining a holder biasing means for biasing the rear end of the holder downward and a pawl biasing means for biasing the pawls away from one another in a direction generally transverse to the longitudinal axis of the level.

By providing a construction in accordance with the present invention, numerous advantages are realized. For example, by providing a securing means including a pair of pawls and a biasing means for biasing the pawls away from one another in a direction transverse to the length of the level, it is possible to provide a construction which can be positively locked in place on a headlamp assembly so that it will not later be jarred from position and render the leveling function of the assembly inoperable.

This construction also permits the apparatus to be removed from the headlamp assembly if desired, simply by squeezing the pawls inward toward one another against the force of the biasing means until they are removed from positive locking engagement with the headlamp assembly. Thus, the apparatus enables simple push-in, snap-fit placement of the apparatus on a headlamp assembly while enabling replacement of the apparatus if necessary.

Another advantage obtained by employing the present invention resides in the use of a pair of arms connected to the holder and operable to both secure the apparatus in place and bias the level in a direction opposing the lifting force of the adjustment means. Such a construction permits the apparatus to be formed of relatively few parts while providing easy assembly and use.

BRIEF DESCRIPTION OF THE DRAWING FIGURES

The preferred embodiment of the invention is described in detail below with reference to the attached drawing figures, wherein:

FIG. 1 is a fragmentary top plan view of a headlamp leveling apparatus constructed in accordance with the preferred embodiment, illustrating the apparatus assembled on a headlamp reflector;

FIG. 2 is a fragmentary side sectional view of the apparatus assembled on the reflector;

FIG. 3 is a fragmentary top plan view of the reflector, illustrating a socket for supporting the leveling apparatus;

FIG. 4 is a fragmentary rear end elevational view of the reflector and socket;

FIG. 5 is a top plan view of the leveling apparatus;

FIG. 6 is a side elevational view of the apparatus;

FIG. 7 is a top plan view of a holder forming a part of the apparatus; and

FIG. 8 is a side sectional view of the apparatus.

DETAILED DESCRIPTION OF A PREFERRED EMBODIMENT

A headlamp leveling apparatus constructed in accordance with the preferred embodiment is illustrated in FIG. 1, as assembled on a reflector of a headlamp assembly.

The headlamp assembly 10 is shown in FIG. 2, and includes the reflector 12, as well as a lamp positioned on the reflector for directing a beam forward of the assembly, and a housing 14 within which the reflector and lamp are enclosed for protection against the elements. Lenses are mounted on the housing for directing the beam of the lamp, and a window 16 is formed in the top of the housing for permitting inspection of the leveling apparatus.

The reflector is illustrated in FIG. 3, and includes a socket within which the leveling apparatus is secured. The socket includes a generally planer support surface 18 along the sides of which a pair of inverted L-shaped walls 20 extend. The support surface has a front edge 22 coextensive with the front edge of the reflector, and is sloped downward toward a rear edge 24. As shown in FIG. 4, gussets 26 are provided beneath the support surface for supporting it on the reflector. Each L-shaped wall includes a vertically extending side wall 28 and a planer top wall 30 that is generally parallel with the support surface, wherein the top walls extend laterally toward one another over the support surface but do not touch each other. Thus, a slot or gap is defined between the top walls for receiving the leveling apparatus in a manner described below.

The front ends of the L-shaped walls are spaced rearward of the front edge of the support surface, and include front walls that partially close off the space defined beneath the top walls. Preferably, the front walls extend laterally inward of the side walls and downward from the top walls, and define a lip 32 adapted for engagement by the leveling apparatus during assembly. The rear ends of the top walls 30 are disposed forward of the rear edge of the support surface, and include angled inside corners 34 that define a mouth for guiding insertion of the leveling apparatus into the socket during assembly.

The leveling apparatus 36 is illustrated in FIG. 5, and broadly includes a level 38, and holder 40, and an adjustment member 42. In addition, as shown in FIG. 8, a backing member 44 is also provided beneath the level for providing a visual contrast that simplifies observation of the level.

With continued reference to FIG. 8, the level 38 preferably includes an elongated glass vial or the like that is partly filled with a liquid, such as a mineral spirit, so as to leave an air bubble that moves to the center point of the vial when the level is on an even horizontal plane. The material used to form the vial is selected to withstand the elevated temperatures experienced in the vicinity of a headlamp, and thus preferably has a melting temperature greater than 350° F., and preferably greater than about 500° F. A plurality of lines 46 or other indicia are provided on the surface of the vial and extend longitudinally outward from the center point so that an observer can easily verify when the air bubble is centered in the vial.

The holder 40 is shown in FIG. 7, and defines a support means for supporting the level on the headlamp assembly. The holder includes a body defining a crib for receiving the level, a pair of arms 48 defining a securing means for securing the apparatus to the headlamp assembly, and a collar 50 for receiving the adjustment member 42. The holder is formed of a material capable of withstanding temperatures in excess of about 350° F. In addition, the material of the holder has a resiliency sufficient to permit the arms and holder to be moved relative to one another and still spring back to the original orientation in which they are molded, shown in FIG. 6. A preferred material includes a glass reinforced synthetic resin such as polyphthalamide.

The body of the holder includes bottom, front, back and side walls 52, 54, 56, 58 presenting an opening in the top of the body within which the level is received. The side walls 58 are provided with tabs 60 that protrude laterally inward toward one another along the top edge of the side walls. The tabs hold the level within the receptacle upon assembly. The bottom wall includes a longitudinal slot 62 that provides the body with sufficient resiliency to facilitate assembly of the level, and permits the tabs to be pushed apart as the level is inserted in the receptacle. In addition, a pair of feet 64 depend from the bottom wall adjacent the front end of the receptacle on either side of the longitudinal slot.

The collar 50 extends rearward from the rear wall of the body, and includes a generally vertically extending threaded opening adapted to receive the adjustment member 42. The adjustment member is a threaded member having a flat lower end adapted to bear against the support surface of the reflector when the apparatus is assembled, and a head at the upper end that permits manipulation of the member to thread it into and out of the collar.

The arms 48 of the holder are identical to one another, each including an inner arm segment 66 that is connected to the front end of the body and extends rearward to a rear free end, and an outer arm segment 68 that is connected to the rear free end of the inner arm segment and extends forward to a forward free end. The outer arm segments 68 include pawls 70 for engaging the lips 32 of the L-shaped walls 20 when the apparatus is inserted into the socket from the rear to positively lock the apparatus in place on the reflector. In addition, the arms 48 include laterally extending stops 72 at the rear free ends of the inner arm segments for engaging the rear ends of the L-shaped walls 20 to prevent the apparatus from being pushed completely through the socket upon assembly.

The outer arm segments 68 are tapered between the forward free ends and the rear ends such that the height of each outer arm segment is greatest at the rear end adjacent the stop. Preferably, the height of the outer arm segments at the rear ends is substantially equal to the vertical distance between the support surface and the top walls of the socket so that as the apparatus is inserted in the socket from the rear, the arms are forced downward by the top walls relative to the body, as shown in FIG. 2. Thus, the resiliency of the material used to form the holder biases the rear end of the body downward, urging the adjustment member against the support surface.

In addition, because the outer arm segments are connected to the inner arm segments at the rear free ends of the inner segments, the pawls 70 are free to move relative to one another in a direction generally transverse to the length of the body. Because of the resiliency of the material of the holder, the pawls may be moved toward one another in order to be received over the lips 32 of the socket during assembly, and still spring back to the original orientation in which they are molded, shown in FIG. 5. Thus, the arms define a biasing means for biasing the pawls outward away from one another in a direction generally transverse to the longitudinal axis of the body, and cause the pawls to positively lock the holder in place once the holder is pushed completely into the socket, as shown in FIGS. 1 and 2.

In order to assemble the preferred leveling apparatus on the reflector of the headlamp assembly, the feet of the apparatus are placed on the support surface to the rear of the L-shaped walls, and the apparatus is pushed forward along the support surface so that the body fits between the top walls. The mouth guides the body between the top walls and centers the apparatus on the support surface so that the pawls engage the lips of the front walls of the socket.

As the apparatus is pushed forward, the lips 32 force the pawls laterally inward toward one another against the biasing force of the arms so that the pawls ride inward and over the lips and lock the apparatus in place, preventing the apparatus from being pulled back out of the socket. In this position of the apparatus, the stops 72 are located adjacent the rear ends of the L-shaped walls 20, and prevent the apparatus from being pushed much further forward into the socket.

Once the holder is positively locked in place on the reflector, the reflector is positioned in a predetermined angular orientation identical to the orientation in which the reflector is to be positioned on an automobile, and the adjustment member 42 is threaded into or out of the collar to adjust the angle of the level so that the air bubble is centered in the vial.

In this manner, the centered bubble is indicative of a properly oriented headlamp assembly, and can thereafter be observed through the window of the headlamp assembly housing in order to permit adjustment of the headlamp assembly relative to an automobile on which the assembly is mounted. If the bubble is not centered in the vial upon installation of the assembly, the rear end of the assembly is raised or lowered until a level condition is observed.

If it is necessary to replace the apparatus for any reason, the pawls may be pressed toward one another against the bias of the arms, releasing the apparatus from the socket so that the apparatus can be pulled rearward out of the assembly. However, as long as the apparatus is locked in place on the reflector, it is not possible for the apparatus to be jarred loose from the assembly.

Although the present invention has been described with reference to the preferred embodiment illustrated in the attached drawing figures, it is noted that substitutions may be made and equivalents employed herein without departing from the scope of the invention as recited in the claims.

What is claimed is:

1. A leveling apparatus for use on the reflector of an automotive headlamp assembly, comprising:

a level defining a longitudinal axis and including a means for indicating when the longitudinal axis is level;

a support means for supporting the level on the reflector, the support means including a holder for the level, a securing means for securing the apparatus to the headlamp assembly, and an adjustment means for adjusting the angular orientation of the level relative to the reflector so that a level indication is provided by the level when the reflector is properly oriented for use, the holder including a front end to which the securing means is connected and a rear end to which the adjustment means is connected;

the securing means including a pair of arms connected to opposite sides of the front end of the holder, the arms including a pair of pawls for engaging the headlamp assembly to secure the holder in place, a holder biasing means for biasing the rear end of the holder downward, and a pawl biasing means for biasing the pawls outward away from one another in a direction generally transverse to the longitudinal axis of the level.

2. A leveling apparatus as recited in claim 1, wherein the holder biasing means is defined by the holder and arms being formed in a predetermined orientation and of a material having resiliency so that when the rear end of the holder is lifted relative to the arms, the arms urge the holder against the lifting force of the adjustment means toward the predetermined orientation.

3. A leveling apparatus as recited in claim 2, wherein each arm includes an inner arm segment that is connected to the front end of the holder and extends rearward to a rear free end, and an outer arm segment that is connected to the rear free end of the inner arm segment and extends forward to a forward free end, the pawls being provided on the forward free ends of the outer arm segments so that when the pawls are forced toward one another the outer arm segments are moved from the position in which they are formed and bias the pawls back away from one another.

4. A leveling apparatus as recited in claim 3, wherein each arm includes a laterally extending stop protruding from the rear free end of the inner arm segment for positioning the apparatus relative to the reflector, the pawls and stops of the apparatus cooperating to secure the apparatus to the headlamp assembly.

5. A leveling apparatus as recited in claim 1, wherein the level includes a vial partly filled with a liquid so as to leave an air bubble that moves to the center of the vial when the level is on an even horizontal plane.

6. A leveling apparatus as recited in claim 1, wherein the holder includes bottom, front, rear and side walls defining a crib within which the level is received, the side walls including tabs that engage the level and hold the level fixed relative to the holder upon assembly of the apparatus.

7. A leveling apparatus as recited in claim 6, wherein the holder includes a threaded collar extending rearward from the rear wall for receiving the adjustment means.

8. A leveling apparatus as recited in claim 7, wherein the adjustment means includes a threaded adjustment member that moves up and down relative to the holder when threaded into and out of the collar.

9. A leveling apparatus as recited in claim 6, wherein the bottom wall of the holder includes a pair of depending feet upon which the apparatus is supported relative to the headlamp assembly, the feet being positioned generally beneath the front wall of the holder so that the holder pivots about the feet upon manipulation of the adjustment means.

10. A leveling apparatus as recited in claim 6, further comprising a backing member positioned between the level and the bottom wall of the holder for providing a visual contrast between the level and the holder.

11. A leveling apparatus as recited in claim 1, wherein the support means is formed of a synthetic resin impregnated with glass fiber.

12. A leveling apparatus as recited in claim 1, wherein the support means is formed of polyphthalamide.

* * * * *